T. L. McNEELY.
REEL.
APPLICATION FILED JULY 7, 1919.
1,323,602.
Patented Dec. 2, 1919.
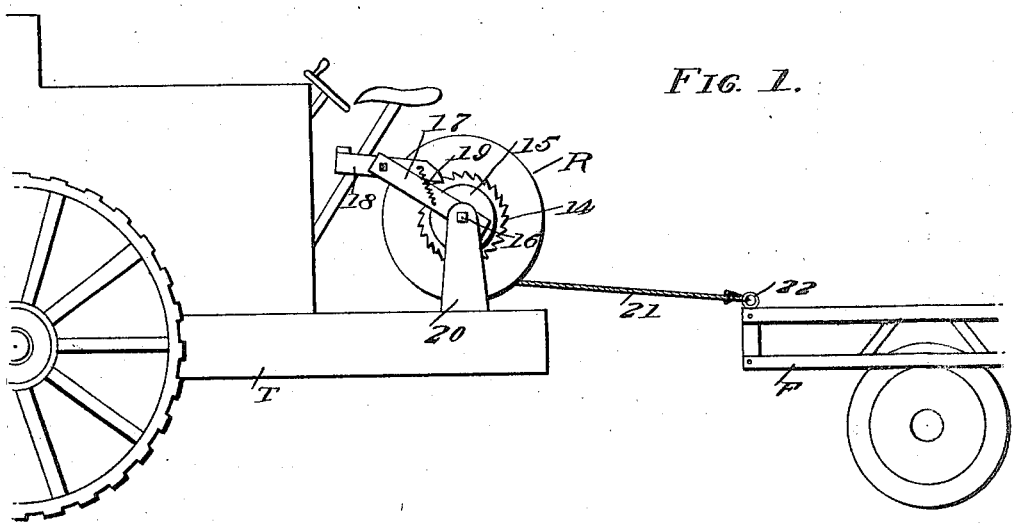
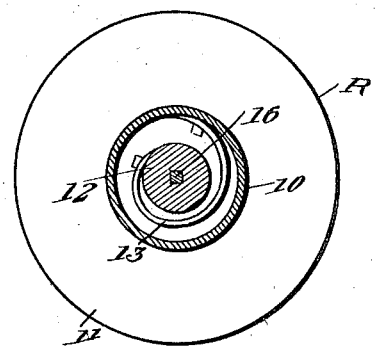
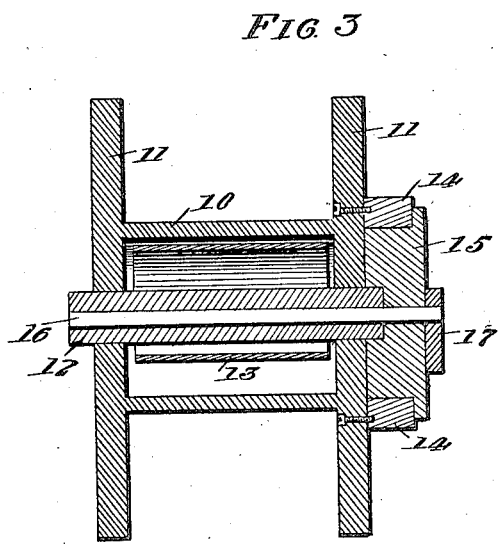
WITNESSES
INVENTOR
T. L. McNEELY,
BY
ATTORNEYS

UNITED STATES PATENT OFFICE.

THOMAS LUDLOW McNEELY, OF COLFAX, LOUISIANA.

REEL.

1,323,602.          Specification of Letters Patent.        Patented Dec. 2, 1919.

Application filed July 7, 1919. Serial No. 308,976.

*To all whom it may concern:*

Be it known that I, THOMAS L. MCNEELY, a citizen of the United States, and a resident of Colfax, in the parish of Grant and State of Louisiana, have made certain new and useful Improvements in Reels, of which the following is a specification.

My invention relates to reels, which are particularly adapted, although not necessarily, to a flexible coupling member for vehicles such as tractors and farming implements.

An object of my invention is the provision of a reel of simple and efficient construction wherein a flexible member for coupling a propelled vehicle and a drawn vehicle can be fed out to vary the distance between the two vehicles or automatically taken up to effect a proper guiding of the drawn vehicle.

It frequently occurs in tractor plowing that a water furrow or other depression in a field remains wet longer than the rest of the field, so that plowing is materially hampered. To overcome this draw-back, a chain or other flexible coupling member has been employed, it being understood that a tractor will readily traverse a wet section of ground providing a plow or other implement is detached. Now because of the flexibility of such a coupling member the plow when encountering a wet section of ground tends to leave its intended course, so that instead of maintaining its alined position with the tractor it travels off at an angle, thus resulting in irregular plowing, and other obvious objections. To again aline the plow and tractor so that the plowing can be continued in its proper course, it is necessary to repeatedly back, and then advance the tractor at various angles until the plow has been moved into proper position. This is obviously a slow and tedious operation. By means of my invention such a manipulation of the tractor is unnecessary because of the reel which automatically absorbs all slack in the flexible coupling, so that a taut connection between the tractor and plow is at all times effected, which permits the plow to be returned to its proper position by backing and advancing the tractor.

I will describe one form of reel of my invention, and will then point out the novel features thereof in claims.

In the accompanying drawings:—

Figure 1 is a fragmentary view showing in side elevation a tractor and a farming implement such as a plow harrow or the like, to which is applied one form of reel embodying my invention.

Fig. 2 is a sectional view of the reel shown in Fig. 1.

Fig. 3 is a longitudinal sectional view of the reel shown in Fig. 1.

Similar reference characters refer to similar parts in each of the several views.

Referring particularly to the drawings, R designates generally the reel which as shown to advantage in Fig. 3, comprises a hollow drum 10, the ends of which are provided with annular flanges 11. Extending longitudinally through the drum 10 is a shaft 12, such shaft having secured thereto one end of a spring 13. The opposite end of the spring 13 is secured to the inner side of the drum as shown in Fig. 2. By this arrangement the spring normally tends to bias the drum 10 in a clockwise direction as when viewed in Fig. 2.

Fixed to one end wall of the drum 10 is a ratchet wheel 14 having the center thereof provided with an opening to receive a flanged hub 15. The hub 15 is secured to the adjacent end of the shaft 12 so that the drum 10 and the ratchet 14 are free to rotate about the shaft 12 and the hub 15. The shaft 12 and hub 15 are provided with squared openings to receive the squared rod 16 for supporting an arm 17, to which latter is pivoted a pawl 18, as clearly shown in Fig. 1. The pawl 18 is biased into engagement with the teeth of the ratchet 14 by means of a spring 19.

As shown in Fig. 2, the reel R is supported by standards 20 secured to the rear end of a tractor T. With the reel R in this position, the pawl 18 and ratchet 14 are so positioned as to permit free rotation of the drum in a clockwise direction, but to lock the drum against rotation when moving in the opposite direction. Wound about the drum 10 is a cable 21, one of its ends being secured to the drum while its opposite end is secured to a ring 22 carried by a farming implement or the like F.

The operation of the reel is as follows: When the tractor T is pulling the implement F, the resistance offered by the latter acts on the cable 21 to rotate the drum in a counter-clockwise direction, but because of the pawl and ratchet, this movement is prevented. When it is desired to increase the distance between the tractor T and the implement F, the pawl 18 is moved out of engagement with the ratchet 14, thus allowing the drum to rotate and the cable 21 to unwind. As the cable unwinds, the drum 10 winds the spring 13 about the shaft 12 so that when it is desired to shorten the distance between the two vehicles, it is only necessary to back the tractor whereby the spring will act to rotate the drum in the opposite direction, and thereby rewind the cable. The tension of the spring 13 is such that during this movement the drum 10 rotates until it absorbs all slack in the cable, so that when the tractor again advances there will be a rigid connection between the same and the implement F.

Although I have herein shown and described only one form of reel embodying my invention, it is to be understood that various changes and modifications may be made herein without departing from the spirit of the invention and the spirit and scope of the appended claims.

Having described my invention, what I claim is:

1. A reel, comprising a shaft, a hollow drum rotatable about the shaft, a spring connected to said shaft and drum and disposed within the latter for biasing the drum about the shaft in one direction, an annular ratchet gear fixed to one end of the drum, a hub disposed within the gear and connected to said shaft, a rod projecting from said hub, an arm fixed to said rod, and a spring-pressed pawl pivoted to said arm and engageable with said gear to lock the drum to said shaft when the drum is rotated in one direction only.

2. In combination, a propelled vehicle, a drawn vehicle, a flexible member connecting the vehicles, and spring actuated means for automatically absorbing the slack in said member when the propelled vehicle moves in the direction of the drawn vehicle.

THOMAS LUDLOW McNEELY.